Patented Oct. 16, 1951

2,571,777

UNITED STATES PATENT OFFICE 2,571,777

ACRYLONITRILE POLYMER MIXED WITH COPOLYMER OF VINYL ACETATE AND ISOPROPENYL ACETATE

Theodore E. Stanin and Joseph B. Dickey, Rochester, N. Y., assignors to Eastman Kodak Company, Rochester, N. Y., a corporation of New Jersey No Drawing. Application April 8, 1950, Serial No. 154,877

17 Claims. (Cl. 260—30.4)

This invention relates to polymer compositions comprising polyacrylonitrile and to articles obtained therefrom.

Acrylonitrile has previously been used in the preparation of various polymers which are characterized by insolubility, or very low solubility, in many of the usual organic solvents. Many of these polymers, especially those containing high percentages of acrylonitrile, are further characterized by their lack of susceptibility to organic dyes, it being well known that fibers spun from polyacrylonitrile solutions can be passed through dye baths without material amounts of the dye adhering to the fiber.

Attempts have been made to increase the dyeability of polyacrylonitrile fibers by interpolymerizing acrylonitrile with certain monomers whose polymers have an affinity for dyes. While this procedure does give polymer products from which fibers having good dyeing properties can be obtained, a serious drawback arises in certain instances due to a substantial lowering of the softening point of the fiber. For example, while an interpolymer of acrylonitrile and vinyl acetate containing about 80 per cent by weight of acrylonitrile and 20 per cent by weight of vinyl acetate in the polymer molecule, can be drawn into fibers readily susceptible to dyes, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye-susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 per cent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogeneous solutions or mixtures of polyacrylonitrile and polyvinyl acetate are too low in softening temperature to be of practical value, and also are subject to the defect of segmentation. This is not surprising because of the non-homogeneous condition of the spinning solution and the fact that it is generally known that polyacrylonitrile is not compatible with many organic substances.

Whereas the mixtures of polyacrylonitrile and polyvinyl acetate mentioned above provide solutions which are heterogeneous and separate into layers on standing, and from which fibers showing segmentation are obtained, we have found that certain mixtures of polyacrylonitrile and certain interpolymers of vinyl acetate with isopropenyl acetate form stable solutions which do not separate into distinct layers on standing, and from which fibers of homogeneous distribution can be spun. These fibers are characterized by softening points higher than the interpolymers of acrylonitrile mentioned above, and do not exhibit the segmentation defect shown by many of the fibers prepared from certain prior art mixtures comprising polyacrylonitrile.

It is, therefore, an object of our invention to provide polymer mixtures comprising polyacrylonitrile and interpolymers of vinyl acetate and isopropenyl acetate.

Another object of our invention is to provide methods for making these mixtures.

A further object of our invention is to provide homogeneous solutions of these polymer mixtures, and fibers prepared therefrom. Other objects will become apparent from a consideration of the following description and examples.

According to our invention, we provide polymer mixtures comprising from 60 to 90 percent by weight of polyacrylonitrile and from 40 to 10 per cent by weight of an interpolymer of vinyl acetate and isopropenyl acetate. Quite unexpectedly, we have found that polymeric compositions having the above proportions of components are excellently adaptable for the spinning of fibres, in that they have high softening points, and provide fibrous products showing no perceptible segmentation.

The interpolymers of vinyl acetate and isopropenyl acetate useful in practicing our invention contain from about 15 to 55 mol per cent of isopropenyl acetate and from about 85 to 45 mol per cent of vinyl acetate in the polymer molecule. Interpolymers containing from 20 to 50 mol per cent of isopropenyl acetate and from 80 to 50 mol per cent of vinyl acetate have been found to be especially useful. These interpolymers can be prepared as described in British Patent 581,255, accepted October 7, 1946, or by the process described in the following examples.

The polyacrylonitrile and interpolymers of isopropenyl acetate and vinyl acetate can be mixed together by any of several methods. The two ingredients can be mixed together in a suitable mixer, such as a ball mill, or they can be dissolved in a mutual solvent (which is known to dissolve polyacrylonitrile), such as N,N-dimethylformamide, N,N-dimethylacetamide, ethylene carbonate, ethylene carbamate, N-methyl-2-pyrrolidone, γ-butyrolactone, etc. The ingredients can be mixed together before addition to the solvent, or each ingredient can be added separately to the solvent. Again, the ingredients can be added to the solvent to produce a slurry, or dispersion, which is agitated and heated to effect solution. The solubility of the resins in the solvents can be improved by incorporating a small amount of certain acids, such as sulfuric acid, phosphoric acid, oxalic acid, etc., as has been described in the copending application Serial No. 49,654, (now U. S. Patent 2,503,244, issued April 11, 1950) and Serial No. 49,655 (now U. S. Patent 2,503,245, issued April 11, 1950) both filed September 16, 1948, of H. W. Coover, T. E. Stanin, and Joseph B. Dickey. The concentration of solids in the solvents can be varied, depending on the use to which the composition is to be put; however, for most purposes it has been found that from about 10 to 40 per cent by weight of solids is adequate.

Other solvents which can be used in the preparation of solutions from our new compositions include N,N-dimethylmethoxyacetamide, dimethylcyanamide, N,N-dimethylcyanoacetamide, N,N-dimethyl-β-cyanopropionamide, glycolonitrile (formaldehyde cyanohydrin), malononitrile, ethylenecyanohydrin, dimethylsulfoxide, dimethyl sulfone, tetramethylene sulfone, tetramethylene sulfoxide, N-formylpyrrolidine, N-formylmorpholine, N,N-tetramethylmethanephosphonamide, etc. Generally speaking, these solvents are not as advantageous as the solvents referred to above.

The solutions of our polymer mixtures in the above solvents, such as N,N-dimethylformamide or N,N-dimethylacetamide, are stable and do not show any tendency to separate. The lack of graininess in these solutions permits smooth, trouble-free extrusion through jets in the spinning of fibers, and permits storage of these solutions for any length of time prior to spinning, without troublesome separation of the solution into distinct layers. The fibers prepared from our new compositions can be deeply dyed with acetate, vat, basic, and acid-wool dyes. The tenacity of these fibers measures between 2.5 and 4.5 grams per denier depending on the spinning, drafting, and shrinking conditions, and the elongation is from about 15 to 25 per cent at break depending upon the shrinking conditions. The sticking points of the fibers obtained from these mixtures, as measured on a hot bar, lie around 180°–200° C., and moisture absorption is from 3 to 5 per cent at 65 per cent relative humidity, depending upon the amount of interpolymer used in the mixture.

The following examples serve to illustrate a method of preparation of interpolymers of isopropenyl acetate and vinyl acetate which can be advantageously used in our invention.

Example 1

15 g. of isopropenyl acetate and 12 g. of vinyl acetate were placed in a glass bottle containing a solution of 2 g. of dihexyl sodiumsulfosuccinate (Aerosol MA) in 100 cc. of distilled water. The mixture was then shaken and 0.6 g. of ammonium persulfate added. The glass bottle was tumbled end-over-end for 20 hours at 60° C. The emulsion was broken with salt, the polymer filtered off with suction, and the filter cake soaked in water to remove unpolymerized monomer. After filtering off the liquor, the filter cake was washed with distilled water and dried. A yield of 10.5 g. of an interpolymer containing 50 mol per cent of isopropenyl acetate and 50 mol per cent of vinyl acetate was obtained.

Example 2

68.8 g. of vinyl acetate and 20 g. of isopropenyl acetate were placed in a flask and 0.44 g. of benzoyl peroxide was added. The mass was then heated on a water bath at 60. C. for 72 hours. The hard mass which resulted was dissolved in methanol, precipitated into water, and dried. A yield of 80 g. of white, fibrous interpolymer was obtained.

The following examples illustrate methods for preparing fibers from the new compositions of our invention.

Example 3

8 g. of the interpolymer of isopropenyl acetate prepared in Example 1 above were dissolved in 300 cc. of N,N-dimethylformamide to which 1.5 g. of phosphorus pentoxide had been added, and the solution was chilled to a temperature below 0° C. There were then added 20 g. of polyacrylonitrile which had been ground to 40-mesh size and which had an inherent viscosity of 3.3. The mixture was then shaken to obtain a smooth, uniform slurry. The slurry was slowly warmed to 100° C. and maintained at that temperature for 15 minutes, at the end of which time a clear, colorless solution was obtained. This solution was free from graininess and gel particles, and, after filtering under pressure, it was spun through a 30-hole jet into a water bath. The filaments which precipitated in the bath were led over delay rolls into a drying chamber heated to 120° C., then drafted 700 per cent at a temperature of 140° C., and allowed to shrink 20 per cent by passage through a chamber containing steam at 120° C. The dried yarn was wound onto a spool by means of a cap spinner which imparted a slight twist of three turns per inch of yarn. The yarn so obtained measured 3.4 grams per denier in tenacity, and showed 24 per cent elongation at break. It did not soften at temperatures below 180° C. on the hot bar, and it was deeply dyed by acetate and basic dyes. The yarn had a moisture absorption of 4.2 per cent at 65 per cent relative humidity.

Example 4

4.2 g. of an interpolymer of isopropenyl acetate and vinyl acetate prepared as described in Example 1 above were dissolved in 300 cc. of N,N-dimethylformamide to which had been added 1.5 g. of phosphorus pentoxide, and then 26.6 g. of polyacrylonitrile having an inherent viscosity of 3.3 were dissolved in this solution according to the method described in Example 3. Yarn was then spun from the solution in the same manner set forth in Example 3. The yarn thus obtained had a tenacity of 3.8 grams per denier, an elongation of 22 per cent at break, and a moisture absorption of 3.8 per cent at 65 per cent relative humidity. The yarn did not soften at temperatures below 190° C. on the hot bar, and it was dyed by acetate dyes, though not as deeply as the yarn of Example 3.

*Example 5*

14.4 g. of an interpolymer of isopropenyl acetate and vinyl acetate prepared as described in Example 1 above were dissolved in 300 cc. of N,N-dimethylformamide to which had been added 15 g. of phosphorus pentoxide, and then 21.6 g. of polyacrylonitrile having an inherent viscosity of 3.3 were dissolved in the solution according to the method described in Example 3 above. Yarn was spun from this solution exactly as described in Example 3. It had an excellent affinity for acetate and basic dyes, although it did not have quite as high a softening point as the yarn obtained in Example 4.

*Example 6*

5 g. of the interpolymer of isopropenyl acetate and vinyl formate prepared in Example 2 above were dissolved in 300 cc. of N,N-dimethylformamide to which 1.5 g. of phosphorus pentoxide had been added, and 25 g. of polyacrylonitrile having an inherent viscosity of 3.3 were dissolved in the solution according to the method described in Example 3 above. Yarn was spun from this solution exactly as described in Example 3. A strong, lustrous, and white yarn was obtained, which was deeply dyed by acetate dyes.

*Example 7*

5 g. of an interpolymer of isopropenyl acetate and vinyl acetate, prepared by the mass method of Example 2 above and containing 40 mol per cent of isopropenyl acetate (yield 60 per cent after 72 hours), were dissolved in 300 cc. of N,N-dimethylformamide to which had been added 1.5 g. of phosphorus pentoxide, and 25 g. of polyacrylonitrile having an inherent viscosity of 3.3 were dissolved in the solution according to the method described in Example 3 above. Yarn spun from this solution according to the directions given in Example 3 above was strong, elastic and susceptible to acetate and basic dyes.

Solvents other than N,N-dimethylformamide, including those solvents which have been listed above, can advantageously be used in the preparation of the synthetic fibers and yarns of our invention.

Instead of using the homopolymer of acrylonitrile, interpolymers of acrylonitrile containing only a small percentage of another vinyl monomer can be used, if desired. The other vinyl monomer should not generally comprise more than about 5 per cent of the interpolymer, since amounts higher than this figure provide interpolymers giving rise to mixtures of too low a softening temperature. For the purposes of our invention, the homopolymer of acrylonitrile has been found to be especially efficacious, however, it is to be understood that the expression polyacrylonitrile as used herein connotes a polymer consisting essentially of acrylonitrile units, with only minor amounts of other vinyl monomers present, if desired. Interpolymers of acrylonitrile containing not more than 5 per cent of some modifier, such as vinyl acetate, vinyl formate, methyl acrylate, styrene, isopropenyl acetate, methyl α-methacrylate, acrylamide, etc. can be used. Such interpolymers have properties not markedly different from the homopolymer of acrylonitrile.

The polyacrylonitrile useful in practicing our invention can be prepared according to the process described in U. S. Patent 2,434,054, dated January 6, 1948, or U. S. Patent 2,296,403, dated September 22, 1942. Other processes which can be used are described in the copending applications, Serial No. 49,651, Serial No. 49,652, and Serial No. 49,653, all filed September 16, 1948, of T. E. Stanin, H. W. Coover, Jr., and J. B. Dickey.

In the preparation of the polymer mixtures of our invention an amount of the isopropenyl acetate-vinyl acetate interpolymers less than about 10 per cent by weight, based on the total weight of the mixture of polyacrylonitrile and the interpolymer of isopropenyl acetate and vinyl acetate, should not be used, since amounts lower than this figure provide mixtures, from which fibers not sufficiently susceptible to dyeing, are formed. On the other hand, mixtures containing more than about 40 per cent by weight of the isopropenyl acetate-vinyl acetate interpolymers provide fibers which lose substantial amounts of the isopropenyl acetate-vinyl acetate interpolymers in washing, or are too low in softening temperature. These defects are avoided in the compositions of our invention described herein and those set forth in the claims appended hereto.

The polymer compositions of our invention are also useful in the preparation of sheets, films, tapes, etc.

What we claim as our invention and desire secured by Letters Patent of the United States is:

1. A resinous composition comprising from 60 to 90 per cent by weight of a polymer containing at least 95 percent by weight of acrylonitrile in the polymer molecule and from 40 to 10 per cent by weight of an interpolymer containing from 15 to 55 mol per cent of isopropenyl acetate and from 85 to 45 mol per cent of vinyl acetate in the polymer molecule.

2. A resinous composition comprising from 65 to 80 per cent by weight of a polymer containing at least 95 percent by weight of acrylonitrile in the polymer molecule and from 35 to 20 per cent by weight of an interpolymer containing from 15 to 55 mol per cent of isopropenyl acetate and from 85 to 45 mol per cent of vinyl acetate in the polymer molecule.

3. A resinous composition comprising from 60 to 90 per cent by weight of a homopolymer of acrylonitrile and from 40 to 10 per cent by weight of an interpolymer containing 50 mol per cent of isopropenyl acetate and 50 mol per cent of vinyl acetate in the polymer molecule.

4. A resinous composition comprising from 60 to 90 per cent by weight of a homopolymer of acrylonitrile and from 40 to 10 per cent by weight of an interpolymer containing 20 mol per cent of isopropenyl acetate and 80 mol per cent of vinyl acetate in the polymer molecule.

5. A resinous composition comprising from 60 to 90 per cent by weight of a homopolymer of acrylonitrile and from 40 to 10 per cent by weight of an interpolymer containing 40 mol per cent of isopropenyl acetate and 60 mol per cent of vinyl acetate in the polymer molecule.

6. A solution of a resinous composition comprising from 60 to 90 per cent by weight of a polymer containing at least 95 percent by weight of acrylonitrile in the polymer molecule and from 40 to 10 per cent by weight of an interpolymer containing from 15 to 55 mol per cent of isopropenyl acetate and from 85 to 45 mol per cent of vinyl acetate in the polymer molecule, in a solvent selected from the group consisting of N,N-dimethylformamide, N,N-dimethylacetamide, ethylene carbonate, ethylene carbamate, N-methyl-2-pyrrolidone, and γ-butyrolactone.

7. A solution of a resinous composition comprising from 60 to 90 per cent by weight of a polymer containing at least 95 percent by weight of acrylonitrile in the polymer molecule and from 40 to 10 per cent by weight of an interpolymer containing from 15 to 55 mol per cent of isopropenyl acetate and from 85 to 45 mol per cent of vinyl acetate in the polymer molecule, in N,N-dimethylformamide.

8. A solution of a resinous composition comprising from 65 to 80 per cent by weight of a polymer containing at least 95 percent by weight of acrylonitrile in the polymer molecule and from 35 to 20 per cent by weight of an interpolymer containing from 15 to 55 mol per cent of isopropenyl acetate and from 85 to 45 mol per cent of vinyl acetate in the polymer molecule, in N,N-dimethylformamide.

9. A solution of a resinous composition comprising from 60 to 90 per cent by weight of a polymer containing at least 95 percent by weight of acrylonitrile in the polymer molecule and from 40 to 10 per cent by weight of an interpolymer containing from 15 to 55 mol per cent of isopropenyl acetate and from 85 to 45 mol per cent of vinyl acetate in the polymer molecule, in N,N-dimethylacetamide.

10. A solution of a resinous composition comprising from 65 to 80 per cent by weight of a polymer containing at least 95 percent by weight of acrylonitrile in the polymer molecule and from 35 to 20 per cent by weight of an interpolymer containing from 15 to 55 mol per cent of isopropenyl acetate and from 85 to 45 mol per cent of vinyl acetate in the polymer molecule, in N,N-dimethylacetamide.

11. A solution of a resinous composition comprising from 60 to 90 per cent by weight of a homopolymer of acrylonitrile and from 40 to 10 per cent by weight of an interpolymer containing 50 mol per cent of isopropenyl acetate and 50 mol per cent of vinyl acetate in the polymer molecule, in N,N-dimethylformamide.

12. A solution of a resinous composition comprising from 60 to 90 per cent by weight of a homopolymer of acrylonitrile and from 40 to 10 per cent by weight of an interpolymer containing 20 mol per cent of isopropenyl acetate and 80 mol per cent of vinyl acetate in the polymer molecule, in N,N-dimethylformamide.

13. A solution of a resinous composition comprising from 60 to 90 per cent by weight of a homopolymer of acrylonitrile and from 40 to 10 per cent by weight of an interpolymer containing 40 mol per cent of isopropenyl acetate and 60 mol per cent of vinyl acetate in the polymer molecule, in N,N-dimethylformamide.

14. A solution of a resinous composition comprising from 60 to 90 per cent by weight of a homopolymer of acrylonitrile and from 40 to 10 per cent by weight of an interpolymer containing 50 mol per cent of isopropenyl acetate and 50 mol per cent of vinyl acetate in the polymer molecule, in N,N-dimethylacetamide.

15. A solution of a resinous composition comprising from 60 to 90 per cent by weight of a homopolymer of acrylonitrile and from 40 to 10 per cent by weight of an interpolymer containing 20 mol per cent of isopropenyl acetate and 80 mol per cent of vinyl acetate in the polymer molecule, in N,N-dimethylacetamide.

16. A synthetic fiber comprising a resinous composition comprising from 60 to 90 per cent by weight of a polymer containing at least 95 percent by weight of acrylonitrile in the polymer molecule and from 40 to 10 per cent by weight of an interpolymer containing from 15 to 55 mol per cent of isopropenyl acetate and from 85 to 45 mol per cent of vinyl acetate in the polymer molecule.

17. A synthetic fiber comprising a resinous composition comprising from 65 to 80 per cent by weight of a polymer containing at least 95 percent by weight of acrylonitrile in the polymer molecule and from 35 to 20 per cent by weight of an interpolymer containing from 15 to 55 mol per cent of isopropenyl acetate and from 85 to 45 mol per cent of vinyl acetate in the polymer molecule.

THEODORE E. STANIN.
JOSEPH B. DICKEY.

No references cited.